(12) United States Patent
Xu et al.

(10) Patent No.: US 9,639,250 B2
(45) Date of Patent: May 2, 2017

(54) SYSTEMS AND METHODS FOR RECONFIGURING A MATRIX IN A DISPLAY

(71) Applicants: Kai Xu, Palo Alto, CA (US); Michelangelo Capraro, Palo Alto, CA (US); Dmitri Krakovsksy, Palo Alto, CA (US); Scott McGhee, Palo Alto, CA (US)

(72) Inventors: Kai Xu, Palo Alto, CA (US); Michelangelo Capraro, Palo Alto, CA (US); Dmitri Krakovsksy, Palo Alto, CA (US); Scott McGhee, Palo Alto, CA (US)

(73) Assignee: SUCCESSFACTORS, INC., So. San Francisco, CA (US)

( * ) Notice: Subject to any disclaimer, the term of this patent is extended or adjusted under 35 U.S.C. 154(b) by 311 days.

(21) Appl. No.: 13/954,709

(22) Filed: Jul. 30, 2013

(65) Prior Publication Data
US 2015/0040039 A1   Feb. 5, 2015

(51) Int. Cl.
G06F 3/048 (2013.01)
G06F 3/0484 (2013.01)
G06F 3/0482 (2013.01)
G06F 3/0488 (2013.01)

(52) U.S. Cl.
CPC ........ *G06F 3/04842* (2013.01); *G06F 3/0482* (2013.01); *G06F 3/04883* (2013.01); *G06F 3/04886* (2013.01); *G06F 2203/04806* (2013.01)

(58) Field of Classification Search
CPC .................................................. G06F 3/04842
See application file for complete search history.

(56) References Cited

U.S. PATENT DOCUMENTS

| 7,325,198 B2 * | 1/2008 | Adcock ............... G06Q 10/109 707/E17.029 |
| 2010/0079490 A1 * | 4/2010 | Terazono .............. G06F 3/0481 345/629 |

(Continued)

FOREIGN PATENT DOCUMENTS

| EP | 2000896 A2 | 12/2008 |
| EP | 2343637 A2 | 7/2011 |

OTHER PUBLICATIONS

Bederson et al.: "A Fisheye Calendar Interface for PDAs: Providing Overviews for Small Displays"; CHI 2003, Conference Proceedings; Conference on Human Factors in Computing Systems; Fort Lauderdale, FL, Apr. 5-10, 2003; pp. 618-619.

(Continued)

*Primary Examiner* — Mohamed Abou El Seoud
(74) *Attorney, Agent, or Firm* — Fountainhead Law Group P.C.

(57) ABSTRACT

The present disclosure includes displaying a matrix. In one embodiment, a computing device is configured to display an N×M matrix comprising N rows and M columns of matrix cells. A selection is received by the computing device of a first matrix cell of the N×M matrix. The first matrix cell has a particular display area. The computing device is reconfigured to display the N×M matrix, wherein a first display area of the first matrix cell is increased, and wherein display areas of a plurality of other matrix cells are decreased.

22 Claims, 8 Drawing Sheets

(56) References Cited

U.S. PATENT DOCUMENTS

2013/0036382 A1\*  2/2013  Yuan ................... G06F 3/0482
                                                        715/815
2013/0055059 A1   2/2013  Schlereth
2013/0212534 A1\*  8/2013  Knight et al. ................ 715/838
2014/0032279 A1\*  1/2014  Zanichelli .......... G06Q 10/1053
                                                        705/7.42

OTHER PUBLICATIONS

Extended European Search Report for EP14002618.8 dated Nov. 28, 2014; 7 pages.

\* cited by examiner

SYSTEMS AND METHODS FOR RECONFIGURING A MATRIX IN A DISPLAY

BACKGROUND

The present invention relates to computing and data processing, and in particular, to reconfiguring a matrix in a display.

The growth in computing power and mobility has placed almost unlimited amounts of data in the hands of users. Cloud computing systems and software as a service remove hardware and software complexities to data centers. Users access powerful backend data processing resources through home computers, laptops, mobile devices such as smartphones and tablets computers, and other emerging portable computing technologies. However, it is ever problematic to provide users with interfaces to data that make data easy to access and manipulate. As computational power increases and computing become ubiquitous, innovative user interface solutions are required that are engaging to the user, intuitive, and easy to manipulate.

SUMMARY

Embodiments of the present disclosure provide systems and methods for configuring a computing device to display a matrix. A matrix may be used to present a wide variety of data. Matrix cells may be selected to reconfigure a matrix in the display to view the selected cell more easily and manipulate data in the selected cell, for example.

In one embodiment, a computing device is configured to display an N×M matrix comprising N rows and M columns of matrix cells. A selection is received by the computing device of a first matrix cell of the N×M matrix. The first matrix cell has a particular display area. The computing device is reconfigured to display the N×M matrix, wherein a first display area of the first matrix cell is increased, and wherein display areas of a plurality of other matrix cells are decreased.

In another embodiment, the present disclosure includes a computer system comprising a processor and a non-transitory computer readable medium having stored thereon one or more programs, which when executed by the processor, causes the processor to perform the techniques set forth herein.

In another embodiment, the present disclosure includes a non-transitory computer readable storage medium storing one or more programs, the one or more programs comprising instructions for performing the techniques set forth herein.

The following detailed description and accompanying drawings provide a better understanding of the nature and advantages of the present disclosure.

DETAILED DESCRIPTION

Described herein are techniques for reconfiguring a matrix in a display. The apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
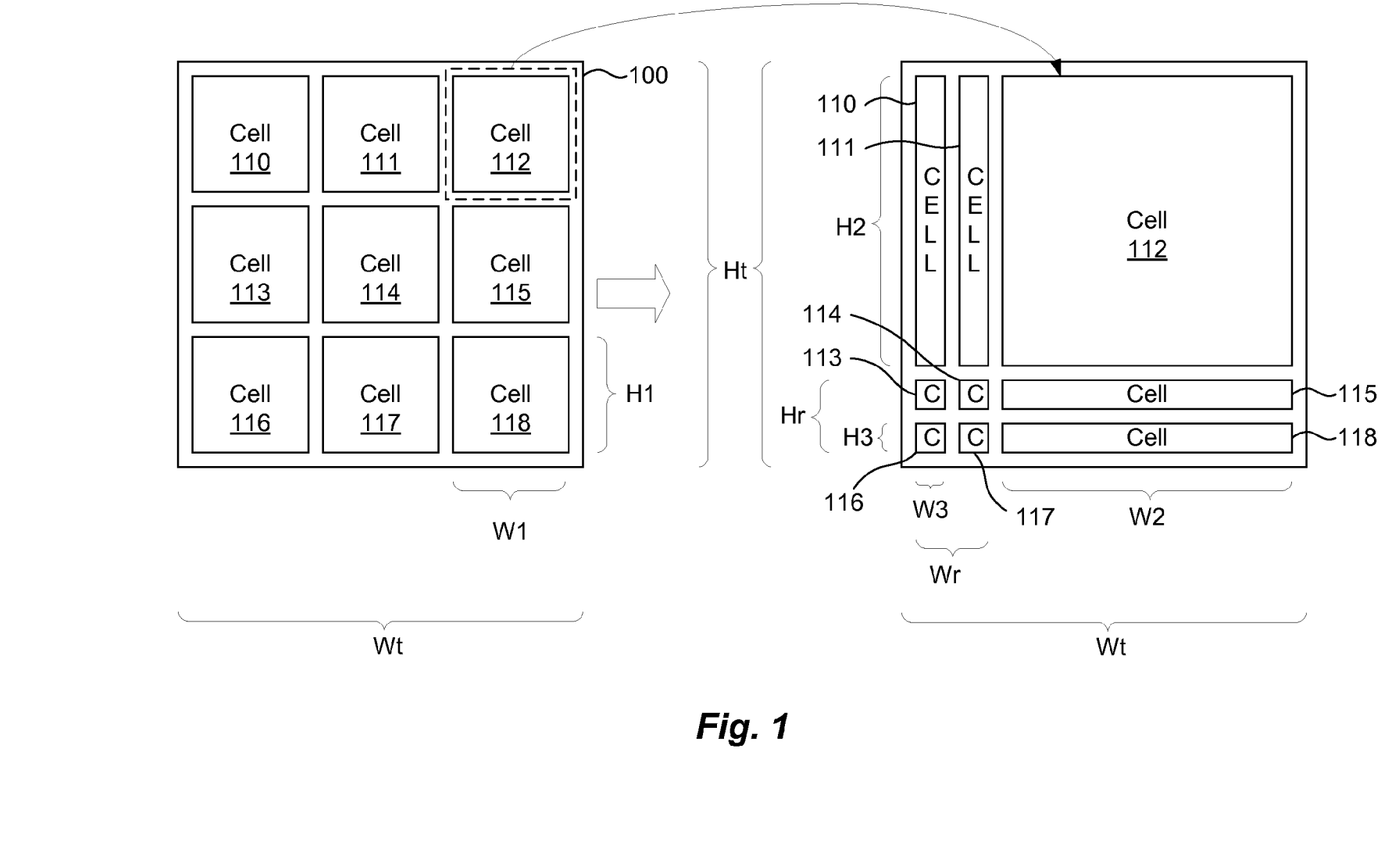
FIG. 1 illustrates reconfiguring a matrix in a display according to one embodiment.

FIG. 1 illustrates reconfiguring a matrix in a display according to one embodiment. In some applications, it may be desirable to display information in a matrix format. FIG. 1 illustrates an example matrix 100 in a display. Matrix 100 includes cells 110-118 arranged in rows and columns. Each cell may display a plurality of data, for example, and different cells may display different data for the same topic or different topics. The cells may include a wide variety of information such as text, images, or multiple data elements from a database as described in more detail below. In this example, matrix 100 is an 3×3 matrix. While the examples shown herein are for a 3×3 matrix, it is to be understood that other numbers of rows and columns may be used for a more generalized N×M matrix having N rows and M columns. In one embodiment, each cell of the matrix may be equally sized as illustrated in FIG. 1. For example, cells 110-118 may occupy the same display area. In this example, cells 110-118 have square shapes having the same height (H1) and a width (W1). Other embodiments may comprise a matrix having cells of other shapes (e.g., circles), but may still occupy a display area with a height and width, for example. The combined cells of an N×M matrix may occupy a total matrix display area, which in this case is defined by a total height (Ht) and a total width (Wt).

Features and advantages of the present disclosure include a matrix selection technique that reconfigures the matrix in the display. For example, if a user selects matrix cell 112, some embodiments may automatically increase the display area of cell 112 as illustrated in FIG. 1. At the same time, display areas of some or all of the other matrix cells may be decreased. In this example, the total display area of matrix 100 is the same before and after the display area of matrix cell 112 is increased. In one embodiment, a computing device may be configured to display an N×M matrix, such as matrix 100, comprising N rows and M columns of equally sized matrix cells. The computing device may receive a selection of a particular matrix cell of the N×M matrix. In one embodiment, the computing device may comprise a touch interface and receive a pinch out gesture in the display area of a particular matrix cell (sometime referred to as a pinch zoom or spread gesture). The computing device may then reconfigure the display of the N×M matrix so that the display area of the selected matrix cell is increased and the display areas of other matrix cells are decreased.

In the example shown in FIG. 1, cell 112 is expanded and the other cells are reduced in size. For example, cell 112 has an initial height H1 and an initial width W1. When cell 112 is expanded, cell 112 has a final height H2 (greater than H1) and a final width W2 (greater than W1). In this example cell 112 is a square and the heights and widths are equal. However, the increased display area of cell 112 changes the dimensions of other cells when the total matrix area stays the same. For instance, cells 110 and 111 are in the same row as selected cell 112. Thus, in this example, when cell 112 is expanded the width of cells 110 and 111 is decreased. On the other hand, because the height of cell 112 is increased, cells in the same row as cell 112 may also have increased heights. In this example, cells 110 and 111 in the same row as selected cell 112 have decreased widths W3 and increased heights H2, where the heights of cells 110-112 are the same.

Similarly, cells 115 and 118 are in the same column as selected cell 112. Thus, when cell 112 is expanded the height of cells 115 and 118 is decreased. On the other hand, because the width of cell 112 is increased, cells in the same column as cell 112 may also have increased widths. In this example, cells 115 and 118 in the same column as selected cell 112 have decreased heights H3 and increased widths W2, where the width of cells 110, 115, and 118 are the same.

Some cells are not in the same row and not in the same column as the cell that is selected. In one embodiment, the display areas of such cells may be decreased so that these cells have heights and widths that are equal to the reduced widths of cells in the same row as the selected cell and the reduced heights of cells in the same column as the selected cell. For example, cells 113, 114, 116, and 117 may have widths equal to the width W3 of cells 110 and 111 and heights equal to the height H3 of cells 115 and 118, for example.

Accordingly, in this example, when matrix cell 112 is selected, matrix cells 110 and 111 in the same row as matrix cell 112 are each reconfigured to have a width W3. Width W3 is related to a remaining width Wr that is the total width of the matrix Wt less the width W2 of the expanded cell. The width W3 of cells 110 and 111 is equal to (or less than) the remaining width Wr divided by a number of matrix cells in the same row as the first matrix cell (here two (2)).

Similarly, in this example, when matrix cell 112 is selected, matrix cells 115 and 118 in the same column as matrix cell 112 are each reconfigured to have a height H3. Height H3 is related to a remaining height Hr that is the total height of the matrix Ht less the height H2 of the expanded cell. The height H3 of cells 115 and 118 is equal to (or less than) the remaining height Hr divided by a number of matrix cells in the same row as the first matrix cell (here two (2)).

Finally, matrix cells not in the same column as matrix cell 112 and not on the same row as matrix cell 112 each have a height equal to the height H3 of the matrix cells 115 and 118 in the same column as matrix cell 112 and a width W3 equal to the width of matrix cells 110 and 112 in the same row as matrix cell 112.

Figure 2:
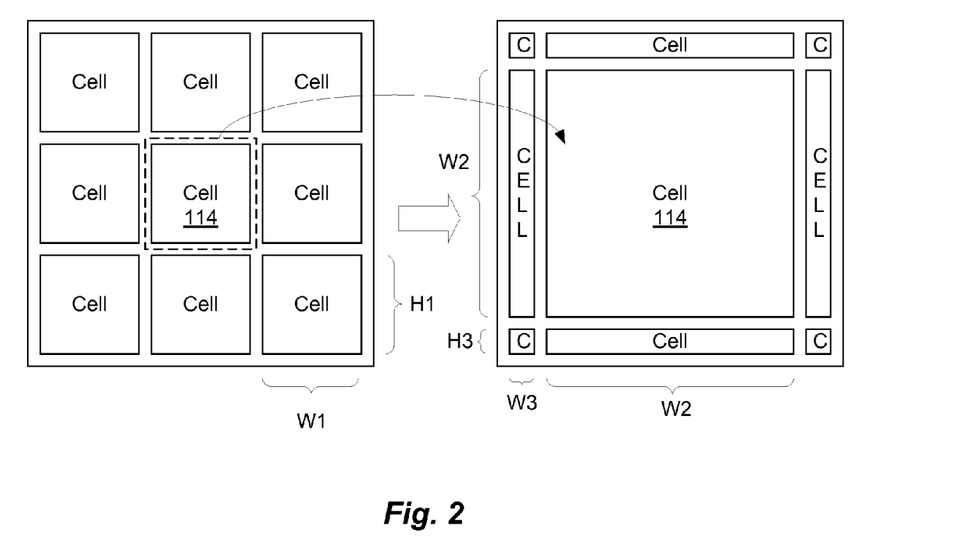
FIGS. 2-3 illustrate reconfiguring matrices according to yet other embodiments.
Figure 3:
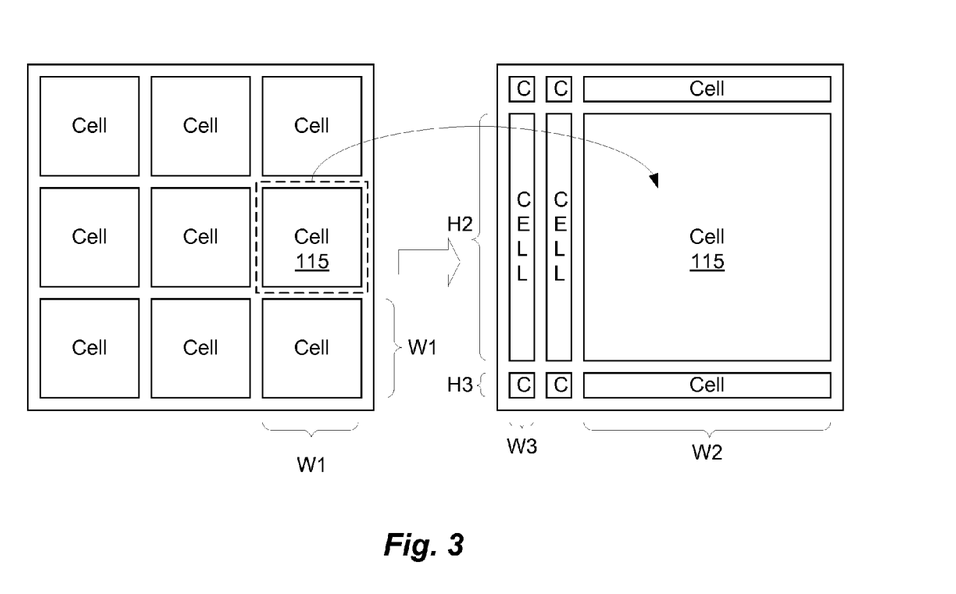

FIGS. 2 and 3 illustrate matrix reconfiguration when different cells are selected. In FIG. 2, an interior cell 114 is selected. The dimensions of cells in the same row, same column, and not in the same row and column are modified as described above. In FIG. 3, a sidewall cell 115 is selected and the cells are modified as described above.

Figure 4:
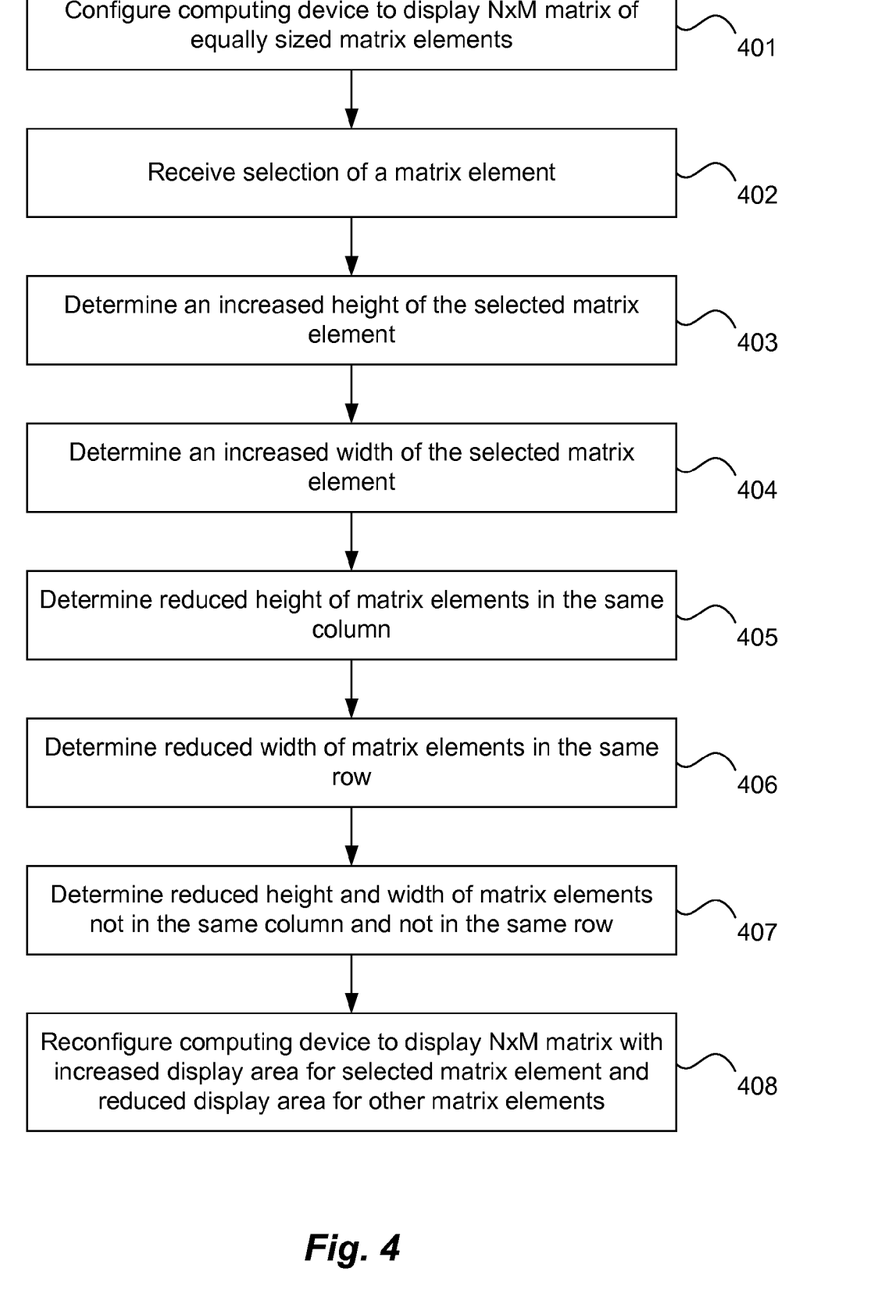
FIG. 4 illustrates an example method of reconfiguring a matrix in a display according to one embodiment.

FIG. 4 illustrates an example method of reconfiguring a matrix in a display according to one embodiment. At 401, a computing device is configured to display an N×M matrix of matrix elements. The matrix elements may be equally sized in some embodiments, and of different sizes in other embodiments. At 402, a selection of one matrix element is received. The selection may be a pinch gesture, for example. At 403, an increased height of the selected matrix element is determined. At 404, an increased width of the selected matrix element is determined. At 405, a reduced height of matrix elements in the same column as the selected matrix element is determined. At 406, a reduced width of matrix elements in the same row as the selected matrix element is determined. At 407, a reduced height and width of matrix element not in the same row and not in the same column as the selected matrix element is determined. At 408, the computing device is reconfigured to display the N×M matrix with an increase display area for the selected matrix element and modified dimensions for the other matrix elements. The modified dimensions (e.g., heights and widths) may be coded as illustrated by an example below.

Figure 5:
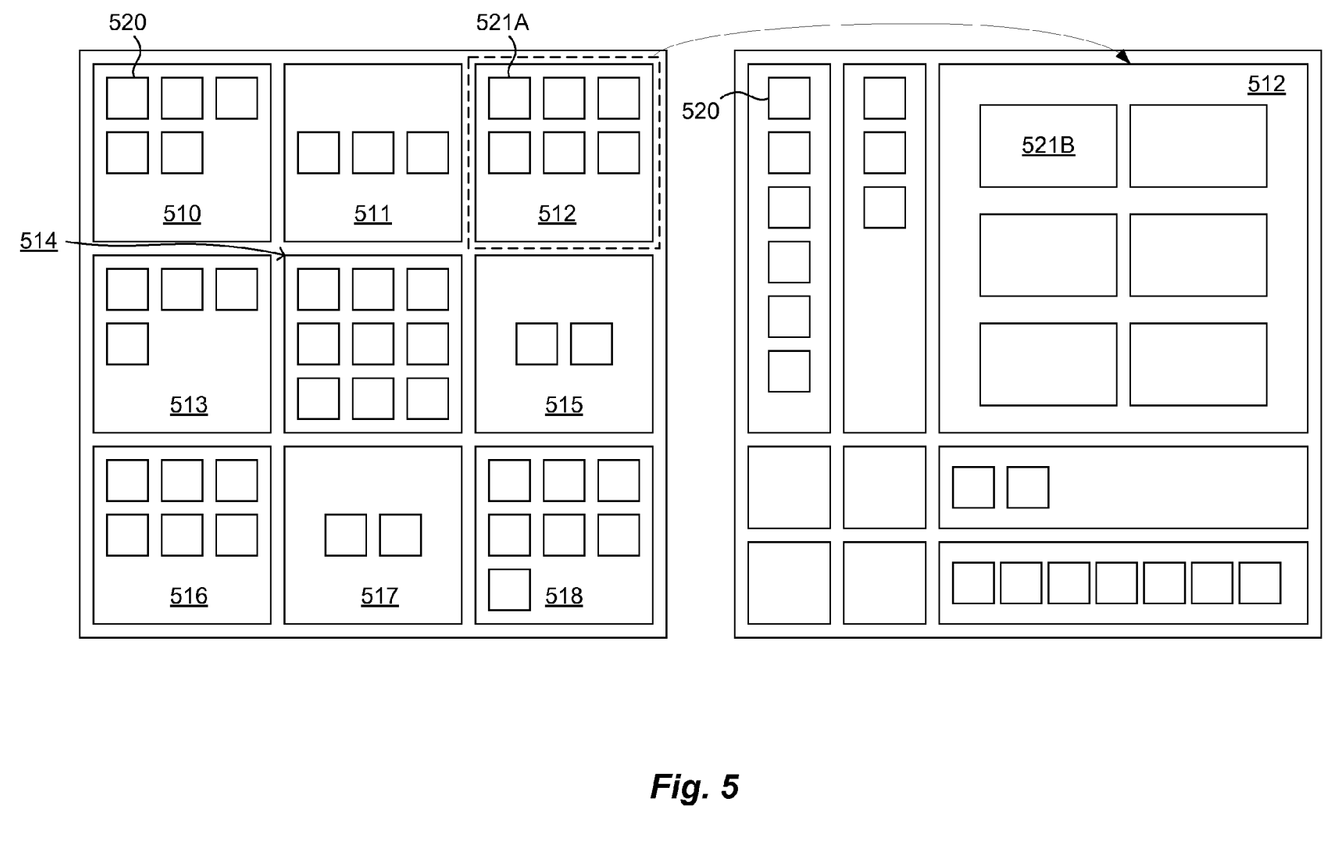
FIG. 5 illustrates data elements in a matrix according to one embodiment.

FIG. 5 illustrates data elements in a matrix according to one embodiment. In some embodiments, data in a selected matrix cell may be modified when the selected matrix cell display area is increased. For example, in one embodiment, when a matrix cell is selected, different data may be accessed and displayed in the expanded matrix cell. In one embodiment, additional data is stored locally (e.g., in a local database). In another embodiment, a matrix may be displayed on a client computer system executing a local application, and the local application may access a backend server application. The backend server may generate a query and return additional data for display in the expanded matrix cell, for example. An example of a local application (e.g., a browser) running on a client computer and a backend server application running on a server computer is provided below.

In the example shown in FIG. 5, cells 510-518 each include one or more data elements, such as data element 520 in cell 510 and data element 521A in cell 512. Data elements may be portions of data from records in a database, for example. In one detailed example provided below, data elements are profile pictures for employees having associated data records in a database. In this example, matrix cell 510 includes 5 data elements, matrix cell 511 includes 3 data elements, matrix cell 512 includes 6 data elements, matrix cell 513 includes 4 data elements, matrix cell 514 includes 9 (or more) data elements, matrix cell 515 includes 2 data elements, matrix cell 516 includes 6 data elements, matrix cell 517 includes 2 data elements, and matrix cell 518 includes 7 data elements. If a cell includes more data elements than the cell can display, the cell may include a scroll (or swipe) feature that allows a user to bring other data elements into view (either with a scroll bar or a swipe gesture, or both).

When cell 512 is selected, cell 512 is expanded as described above and the data displayed may change. In one embodiment, a query returns data associated with each data element in cell 512 and the new data is displayed. For example, data element 521A may be associated with data in a database. When cell 512 is expanded, new data associated with data element 521A is displayed at 521B. The new data may include the data element 521A, for example, or the new data may be entirely different than the data presented in cell 512 before selection. In one example embodiment, data elements in cell 512 prior to selection are thumbnails—e.g., reduced-size versions of pictures, used to help in recognizing and organizing them. When cell 512 is selected and increased in size, the thumbnail may be displayed with data from an associated data record. In one embodiment, configuration data may be associated with a matrix or a matrix cell indicating the particular data from a data record to be displayed when a cell is selected, for example. Data elements from other unselected cells in the same row or same column as the selected cell are displayed in the same format before and after selection of particular cell (e.g., as thumbnails). Data elements from cells that are not in the same row and not in the same column as cell 512 are omitted, in this example, because such cells have been set to minimum height and width values.

Figure 6:
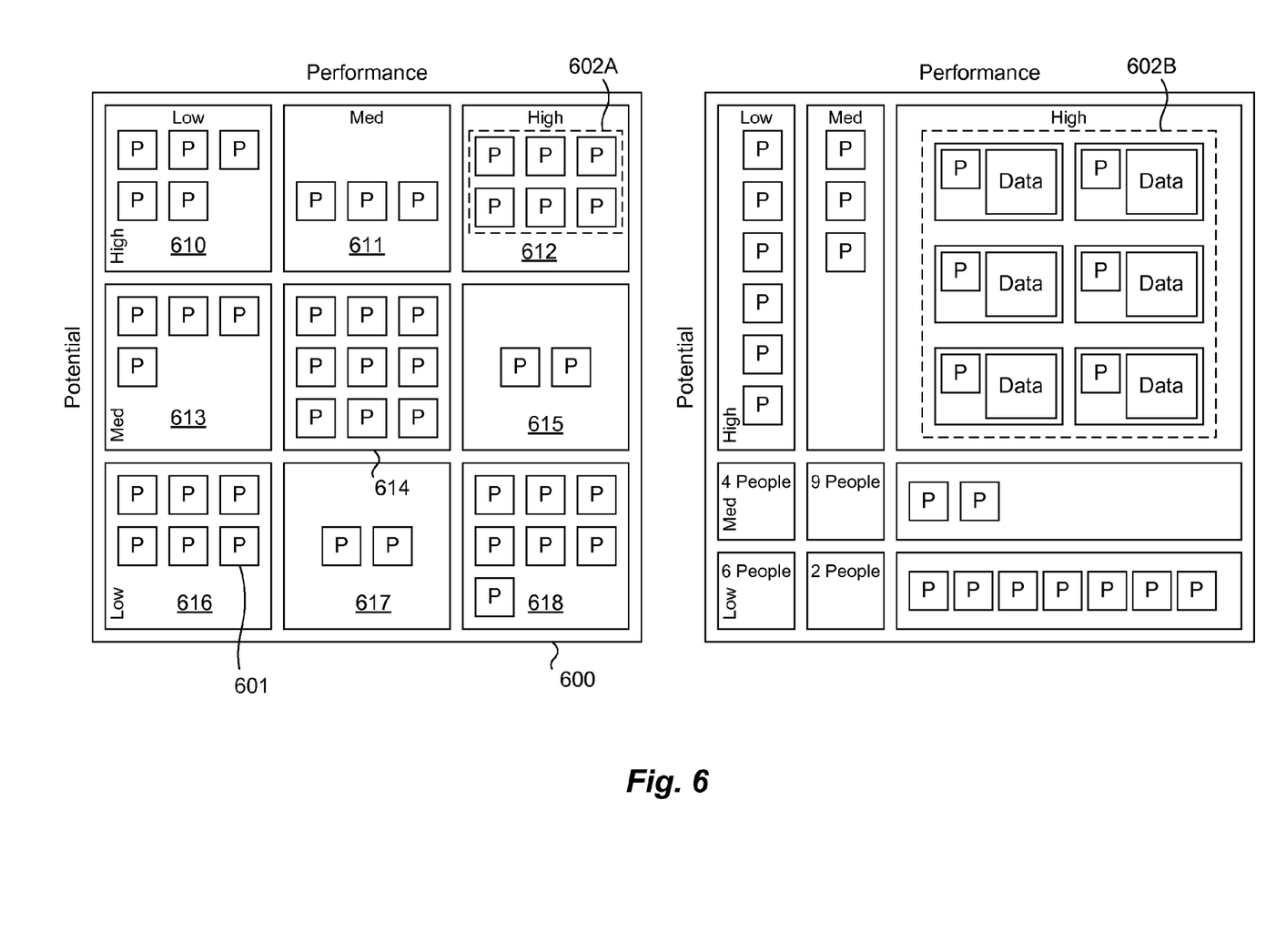
FIG. 6 illustrates reconfiguring a performance matrix according to one embodiment.

FIG. 6 illustrates reconfiguring a performance matrix according to one embodiment. In this example, matrix 600 is a performance matrix. In a performance matrix, employees may be classified into groups based on scores for performance and potential. Employees with low performance scores are placed toward the left hand columns, and employees with high performance scores are placed toward the right hand columns. In this example, employees with medium performance scores are in the center column. Similarly, employees with low potential scores are placed toward the lower rows, and employees with high potential scores are placed toward the higher rows. In this example, employees with medium potential scores are in the center row.

Performance matrix 600 is configured to display data elements in matrix cells 610-618. In this example, data elements are thumbnails of profile pictures (e.g., profile picture 601) to indicate where different employees fall in the performance matrix. When a user selects one of the matrix cells, the display area of the selected cell is increased. In this example, selecting data element 612 causes the system to retrieve data for the 6 employee data elements 602A in cell 612. Configuration parameters may specify the data to be retrieved and displayed in the expanded cell. Here, the 6 profile thumbnails in cell 612 are displayed with the retrieved data as shown at 602B, which may include an employee's name, current position in the organization, or other data about the employee, for example.

In this example, data elements in cells in the same row as the selected cell and data elements in cells in the same column as the selected data cell are displayed in the reconfigured matrix. For example, the thumbnail profile data elements from cells 610, 611, 615, and 618 are displayed in corresponding cells having modified dimensions as shown. In this example, data elements in cells not in the same row, and not in the same column, as the selected cell are not displayed in the reconfigured matrix. For instance, data elements in cells 613, 614, 616, and 617 are not displayed in the reconfigured matrix as shown.

Figure 7:
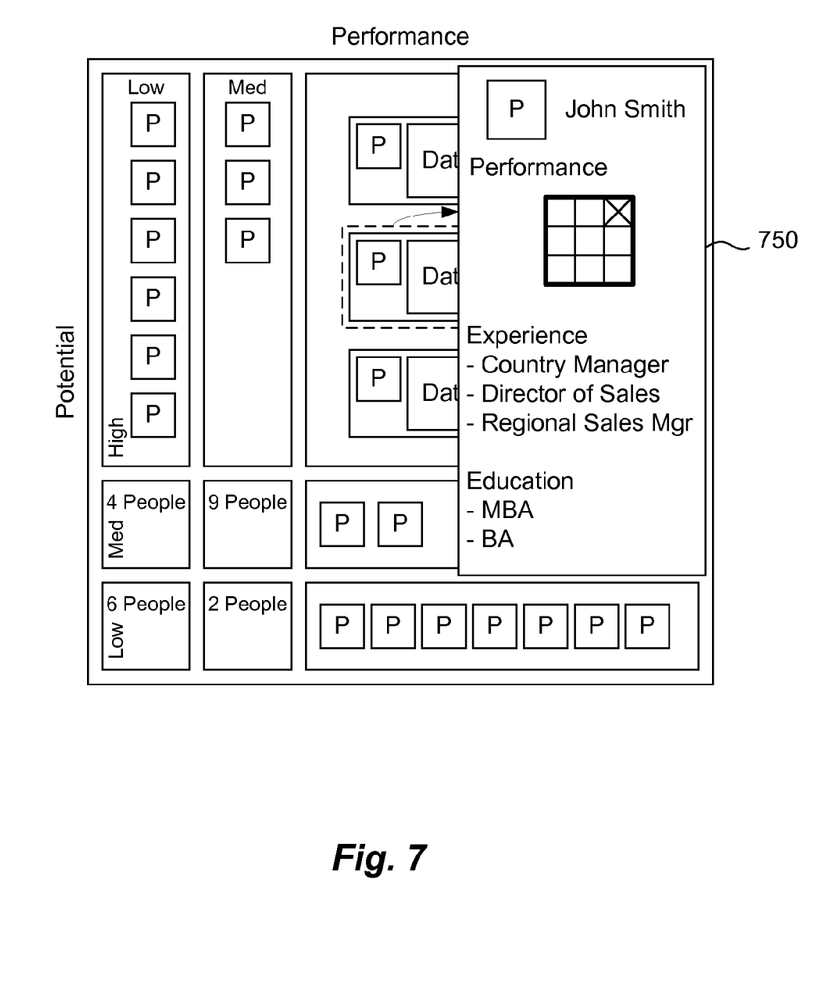
FIG. 7 illustrates accessing data in a performance matrix according to one embodiment.

FIG. 7 illustrates accessing data in a performance matrix according to one embodiment. As described above, a user may select different matrix cells to expand each particular cell and expand the data displayed in the selected cell. Thus, a user may move quickly from cell to cell, selecting each in turn, to obtain further information about each cell. Furthermore, in one embodiment, when a cell is selected, the data elements displayed in the expanded cell may be active components. For example, FIG. 7 illustrates an expanded cell in a performance matrix. If a user selects a particular data element in the expanded cell (e.g., via touch, pinch, mouse click, or mouse rollover), the system may access yet further data about the particular data element. In this example, data about an employee associated with the selected data element is displayed in a popup (or overlay) 750. The popup may display the employees name, profile picture, performance matrix position, work experience, and education. Using configuration settings, a variety of different employee information may be specified to be displayed in a popup, for example.

The following is example code used to implement a matrix pinch operation described above:

```
<style>
/* Summarized only related styles for matrix pinch */
.peopleList {
    height: 215px; /* Normal width/height */
    width: 429px; /* Normal width/height */
    transition: width .5s, height .5s; /* animate when changed */
}
.cellZoomInX .peopleList,
.cellZoomIn .peopleList {
    width: 1127px;    /* Zoom in width */
}
.cellZoomInY .peopleList,
.cellZoomIn .peopleList {
    height: 485px;    /* Zoom in height */
}
.cellZoomInY .peopleList,
.cellZoomOut .peopleList {
    width: 80px;      /* Zoom out width */
}
.cellZoomInX .peopleList,
.cellZoomOut .peopleList {
    height: 80px;     /* Zoom out height */
}
</style>
<script>
/* Pseudocode
  Note: When applying a class to the userCell, the different width
  And heights for the cell will apply. CSS3 transition/animation will
  Make the cells grow/shrink.
*/
function setZoomCell(y, x, zoom) {
    for each userCell div
        if zoom is false
            remove any userCell class
        else if userCell has same x & same y coordinate
            set userCell class "cellZoomIn"
        else if userCell only has y in common
            set userCell class "cellZoomInY"
        else if userCell only has x in common
            set userCell class "cellZoomInX"
        else
            set userCell class "cellZoomOut"
}
/* Pseudocode
  Note: This click event is fired any time you click inside the
  Matrix.
*/
function handleClick(event) {
    if (user clicked outside of any cell)
        setZoomCell(0, 0, false);
    else
        get the coordinate of the cell clicked
        if the cell clicked was zoomed in already
            setZoomCell(y, x, false)
        else
            setZoomCell(y, x, true)
}
/* Pseudocode
  Note: A gesture event is fired on iPad when the user does a pinch
  to zoom gesture. The incoming event will contain a "scale" property
  If that scale property is greater than 1 then the user is trying
  to zoom in, otherwise if less than 1 he is trying to zoom out.
*/
function handleGesture(event) {
    get the coordinate of the cell being gestured on
    zoom = true if the gesture event is zooming in
```

```
        setZoomCell(y, x, zoom)
    }
</script>
<div onclick="handleClick(event)"
    ongestureend="handleGesture(event)">
    <div class="cellContainer">
        <div class="rowContainer">
            <div class="userCell">
                <!-- insert HTML for cell labels -->
                <div class="peopleList">
                    <!-- insert HTML for People -->
                </div>
            </div>
            <!-- Repeat userCell for each column -->
        </div>
        <!-- Repeat rowContainer for each row -->
    </div>
</div>
```

Example Hardware

Figure 8:
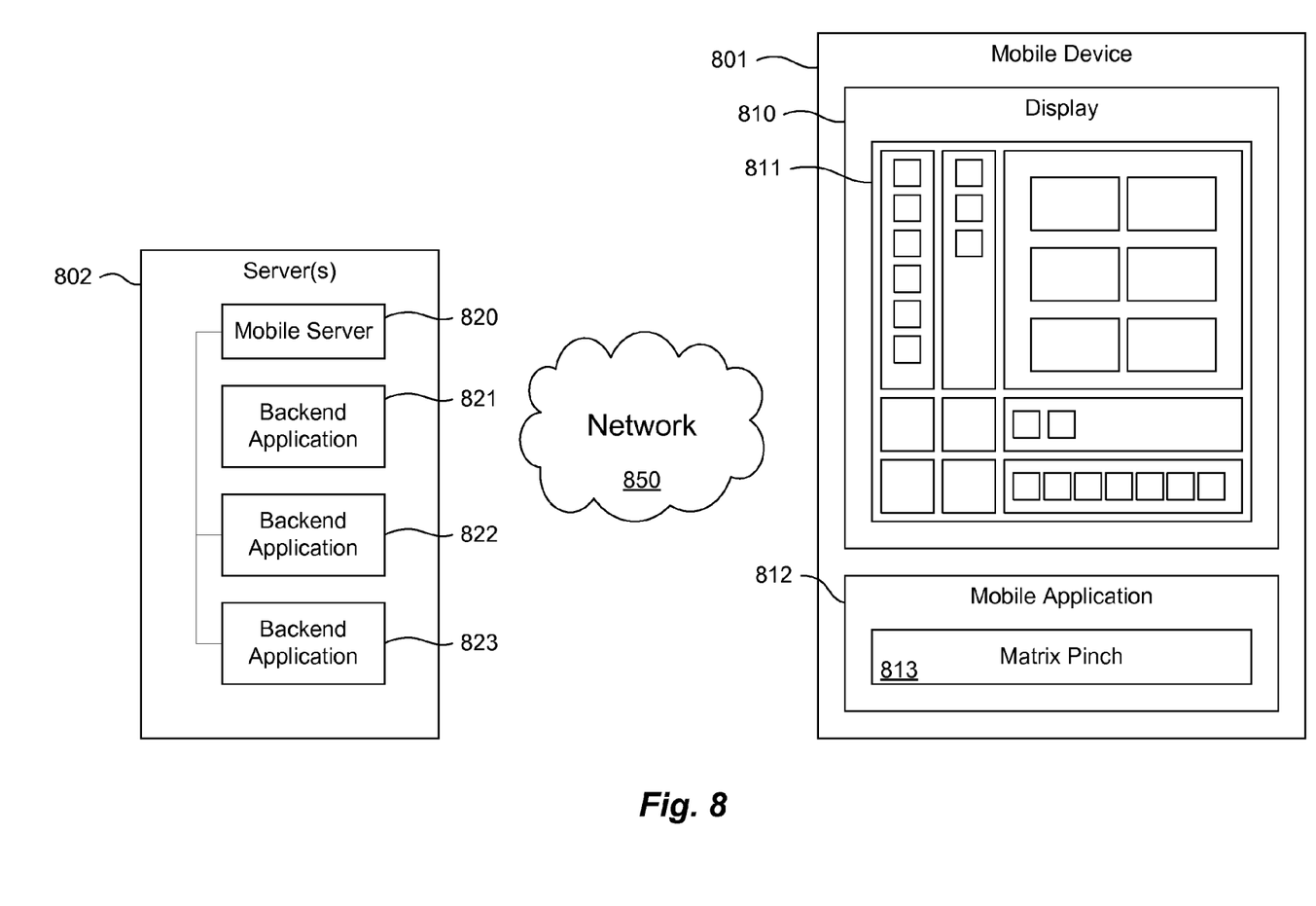
FIG. 8 illustrates an application including a pinch matrix operating on a mobile computing deviced according to one embodiment.

FIG. 8 illustrates an application including a pinch matrix operating on a mobile computing deviced according to one embodiment. As illustrated in FIG. 8, a mobile computing device 801 (or just, "mobile device") executes a mobile application 812. Mobile device 801 may be a mobile phone, such as a smartphone, or a tablet computer, for example. Such mobile devices may include one or more processors and memory for storing instructions to perform a wide variety of features and functions, including the features described herein. For example, mobile application 812 may include a matrix pinch 813 component for reconfiguring selected matrix cells or accessing data for selected cells, or both, to display a matrix 811 in display 810 as described above. Mobile device 801 may connect to other remote systems such as one or more servers 802 over a network 850, for example. Network 850 is illustrative of one or more networks for communicating information with other computer systems, such as a cellular communication network, an Ethernet network, the Internet, or a wireless network, for example. Mobile application 812 executing on mobile device 801 may receive and send data from one or more remote systems or from a user via a user interface including display 810, for example. In this example, mobile application 812 may communicate with a mobile server 820. Mobile server 820, in turn, may act as an interface between mobile application 812 and backend applications 821-823.

Figure 9:
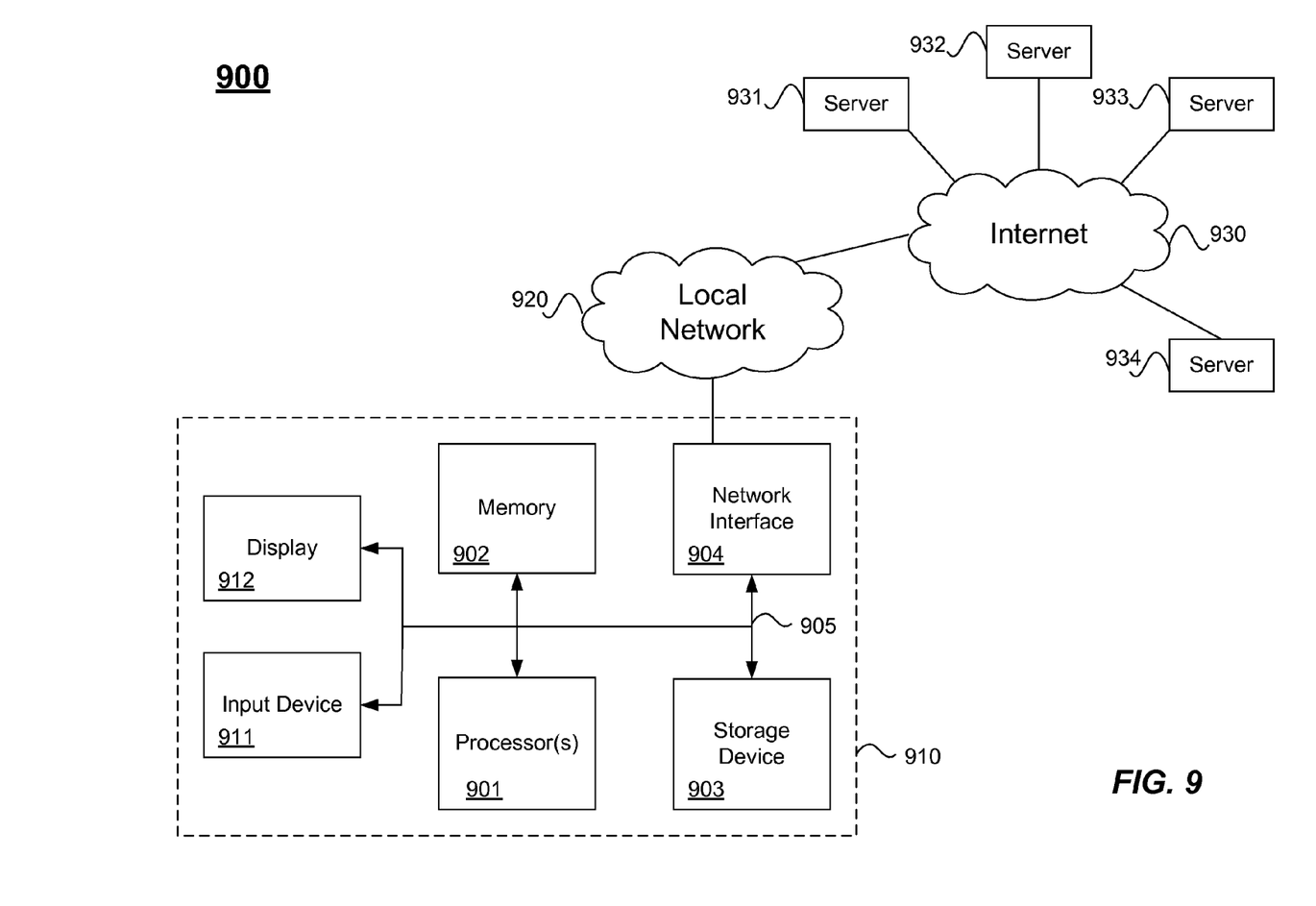
FIG. 9 illustrates hardware of a special purpose computing machine configured with a process according to the above disclosure.

FIG. 9 illustrates hardware of a special purpose computing machine configured with a process according to the above disclosure. The following hardware description is merely one example. It is to be understood that a variety of computer topologies may be used to implement the above described techniques. An example computer system 910 is illustrated in FIG. 9. Computer system 910 includes a bus 905 or other communication mechanism for communicating information, and one or more processor(s) 901 coupled with bus 905 for processing information. Computer system 910 also includes a memory 902 coupled to bus 905 for storing information and instructions to be executed by processor 901, including information and instructions for performing some of the techniques described above, for example. This memory may also be used for storing programs executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 903 may include source code, binary code, or software files for performing the techniques above, for example. Storage device and memory are both examples of non-transitory computer readable storage mediums.

Computer system 910 may be coupled via bus 905 to a display 912 for displaying information to a computer user. An input device 911 such as a keyboard, touchscreen, and/or mouse is coupled to bus 905 for communicating information and command selections from the user to processor 901. The combination of these components allows the user to communicate with the system. Bus 905 may represent multiple specialized buses and digital communication channels, for example.

Computer system 910 also includes a network interface 904 coupled with bus 905. Network interface 904 may provide two-way data communication between computer system 910 and a local network 920. The network interface 904 may be a wireless or wired connection, for example. Computer system 910 can send and receive information through the network interface 904 across a local area network, an Intranet, a cellular network, or the Internet, for example. One example implementation may include matrix pinch program code executing on a computing system 910 as described above. In the Internet example, a matrix pinch component, for example, may access data on backend systems that may reside on multiple different hardware servers 931-935 across the network. Servers 931-935 and server applications may also reside in a cloud computing environment, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:
1. A method comprising:
  configuring a computing device to display an N×M matrix comprising N rows and M columns of matrix cells, wherein a plurality of the matrix cells comprise a plurality of pictures displayed in particular matrix cells, and wherein each picture is associated with data from a record in a database;
  receiving, by the computing device, a selection of a first matrix cell of the N×M matrix, the first matrix cell having a first display area that includes a plurality of pictures;
  in response to the selection, retrieving, for each picture in the plurality of pictures in the first display area of the first matrix cell, at least a portion of the data from the corresponding record in the database;
  reconfiguring the N×M matrix by increasing an area of the first display area of the first matrix cell and modifying display areas of a plurality of other matrix cells; and
  in response to said reconfiguring:
    displaying each picture in the first display area of the first matrix cell with the at least a portion of the data associated with the picture;

displaying pictures in matrix cells in the same row as the first matrix cell as single columns;

displaying pictures in matrix cells in the same column as the first matrix cell as single rows; and displaying nothing in matrix cells that are not in the same row as the first matrix cell and not in the same column as the first matrix cell.

2. The method of claim 1, wherein matrix cells are equally sized before said reconfiguration.

3. The method of claim 1, wherein the N×M matrix has a total display area, and wherein the total display area of the N×M matrix before the reconfiguration and the total display area of the N×M matrix after the reconfiguration are the same.

4. The method of claim 1, wherein increasing the first display area of the first matrix cell comprises increasing a height of the first display area and increasing a width of the first display area, wherein modifying the display areas of the plurality of other matrix cells comprises decreasing a height of matrix cells in the same column as the first matrix cell, increasing a width of the matrix cells in the same column as the first matrix cell, decreasing a width of matrix cells in the same row as the first matrix cell, and increasing a height of the matrix cells in the same row as the first matrix cell.

5. The method of claim 4, wherein modifying the display areas of the plurality of other matrix cells comprises decreasing a height of matrix cells not in the same row as the first matrix cell and not in the same column as the first matrix cell and decreasing a width of the matrix cells not in the same row as the first matrix cell and not in the same column as the first matrix cell.

6. The method of claim 1, wherein the N×M matrix has a total height and a total width, and wherein after the first matrix cell is increased:

the first matrix cell has a first height and a first width, matrix cells in the same row as the first matrix cell each have a second width less than or equal to a remaining width divided by a number of said matrix cells in the same row as the first matrix cell, wherein the remaining width is the total width less the first width, matrix cells in the same column as the first matrix cell each have a second height less than or equal to a remaining height divided by a number of said matrix cells in the same column as the first matrix cell, wherein the remaining height is the total height less the first height, and matrix cells not in the same column as the first matrix cell and not on the same row as the first matrix cell each have a height equal to the second height and a width equal to the second width.

7. The method of claim 1, wherein a plurality of matrix cells, including the first matrix cell, display a plurality of data, and wherein when the first matrix cell is increased, different data is displayed in the first matrix cell.

8. A method comprising:

configuring a computing device to display an N×M matrix comprising N rows and M columns of equally sized matrix cells and a plurality of data elements, wherein one or more matrix cells display one or more of said plurality of data elements, and wherein each data element is associated with data from a record in a database;

receiving, by the computing device, a selection of a first matrix cell of the N×M matrix, the first matrix cell having a first display area that includes a plurality of data elements that are thumbnail versions of profile pictures; and in response to the selection, retrieving, for each data element in the plurality of data elements in the first display area of the first matrix cell, employee data from the corresponding record in the database;

reconfiguring the N×M matrix by increasing the first display area of the first matrix cell and modifying display areas of a plurality of other matrix cells; and in response to said reconfiguration, displaying each data element in the first matrix cell as the profile picture and with the employee data associated with the data element, and wherein the N×M matrix is a performance matrix.

9. The method of claim 8, wherein detailed performance data is displayed in response to selection of a data element in the first matrix cell when the first matrix cell is increased.

10. The method of claim 1, wherein the selection is a pinch out gesture.

11. A computer system comprising:

a processor; and a non-transitory computer readable medium having stored thereon one or more programs, which when executed by the processor, causes the processor to:

configure the computer to display an N×M matrix comprising N rows and M columns of matrix cells, wherein a plurality of the matrix cells comprise a plurality of pictures displayed in particular matrix cells, and wherein each picture is associated with data from a record in a database;

receive a selection of a first matrix cell of the N×M matrix, the first matrix cell having a first display area that includes a plurality of pictures;

in response to the selection, retrieve, for each picture in the plurality of pictures in the first display area of the first matrix cell, at least a portion of the data from the corresponding record in the database;

reconfigure the N×M matrix by increasing an area of the first display area of the first matrix cell and modifying display areas of a plurality of other matrix cells; and in response to said reconfigure:

display each picture in the first display area of the first matrix cell with the at least a portion of the data associated with the picture;

display pictures in matrix cells in the same row as the first matrix cell as single columns;

display pictures in matrix cells in the same column as the first matrix cell as single rows; and display nothing in matrix cells that are not in the same row as the first matrix cell and not in the same column as the first matrix cell.

12. The computer system of claim 11, wherein the N×M matrix has a total height and a total width, and wherein after the first matrix cell is increased:

the first matrix cell has a first height and a first width, matrix cells in the same row as the first matrix cell each have a second width less than or equal to a remaining width divided by a number of said matrix cells in the same row as the first matrix cell, wherein the remaining width is the total width less the first width, matrix cells in the same column as the first matrix cell each have a second height less than or equal to a remaining height divided by a number of said matrix cells in the same column as the first matrix cell, wherein the remaining height is the total height less the first height, and matrix cells not in the same column as the first matrix cell and not on the same row as the first matrix cell each have a height equal to the second height and a width equal to the second width.

13. The computer system of claim 11, wherein the selection is a pinch out gesture.

14. A non-transitory computer readable storage medium storing one or more programs, the one or more programs comprising instructions for:
configuring a computing device to display an N×M matrix comprising N rows and M columns of matrix cells, wherein a plurality of the matrix cells comprise a plurality of pictures displayed in particular matrix cells, and wherein each picture is associated with data from a record in a database;
receiving a selection of a first matrix cell of the N×M matrix, the first matrix cell having a first display area that includes a plurality of pictures;
in response to the selection, retrieving, for each picture in the plurality of pictures in the first display area of the first matrix cell, at least a portion of the data from the corresponding record in the database;
reconfiguring the N×M matrix by increasing an area of the first display area of the first matrix cell and modifying display areas of a plurality of other matrix cells; and
in response to said reconfiguring:
displaying each picture in the first display area of the first matrix cell with the at least a portion of the data associated with the picture;
displaying pictures in matrix cells in the same row as the first matrix cell as single columns;
displaying pictures in matrix cells in the same column as the first matrix cell as single rows; and
displaying nothing in matrix cells that are not in the same row as the first matrix cell and not in the same column as the first matrix cell.

15. The non-transitory computer readable storage medium of claim 14, wherein the N×M matrix has a total height and a total width, and wherein after the first matrix cell is increased:
the first matrix cell has a first height and a first width,
matrix cells in the same row as the first matrix cell each have a width less than or equal to a remaining width divided by a number of said matrix cells in the same row as the first matrix cell, wherein the remaining width is the total width less the first width,
matrix cells in the same column as the first matrix cell each have a height less than or equal to a remaining height divided by a number of said matrix cells in the same column as the first matrix cell, wherein the remaining height is the total height less the first height, and
matrix cells not in the same column as the first matrix cell and not on the same row as the first matrix cell each have a second height equal to the height of the matrix cells in the same column as the first matrix cell and a second width equal to the width of the matrix cells in the same row as the first matrix cell.

16. The non-transitory computer readable storage medium of claim 14, wherein the selection is a pinch out gesture.

17. The method of claim 1, wherein configuration data indicates particular data of the data associated with each picture that is displayed when the first matrix cell is selected.

18. The method of claim 1, wherein pictures in the first matrix cell are active components, the method further comprising, accessing, in response to a second selection of a picture in the first matrix cell having said increased first display area, additional data associated with each picture and displaying the additional data associated with each picture as an overlay covering at least a portion of one or more matrix cells.

19. The method of claim 18, wherein the additional data is specified using configuration settings.

20. The method of claim 1, wherein the N×M matrix is a performance matrix, wherein the pictures are profile pictures, and wherein data associated with each picture is employee data, and wherein the employee data is classified into groups based on scores for performance and potential, wherein pictures having associated employee data with low performance scores are placed toward left hand columns of the N×M matrix, and pictures having associated employee data with high performance scores are placed toward right hand columns of the N×M matrix, and wherein pictures having associated employee data with low potential scores are placed toward lower rows of the N×M matrix, and pictures having associated employees data with high potential scores are placed toward higher rows of the N×M matrix.

21. The method of claim 1, wherein pictures in a same matrix cell have a common grouping and pictures in different matrix cells have at least one distinct grouping.

22. The method of claim 21, wherein the pictures correspond to employees classified into groups based on scores for performance and potential.

* * * * *